C. BURSELL.
HOOF PARER.
APPLICATION FILED AUG. 25, 1911.

1,023,990.

Patented Apr. 23, 1912.

2 SHEETS—SHEET 1.

Witnesses:
R. E. Hamilton
E. C. Lillian

Inventor,
Charles Bursell,
By F. G. Fischer,
atty.

C. BURSELL.
HOOF PARER.
APPLICATION FILED AUG. 25, 1911.
1,023,990.
Patented Apr. 23, 1912.
2 SHEETS—SHEET 2.
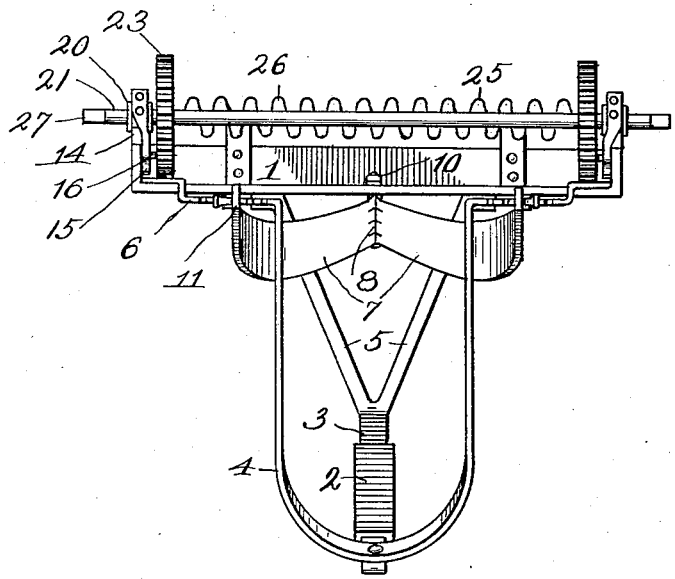
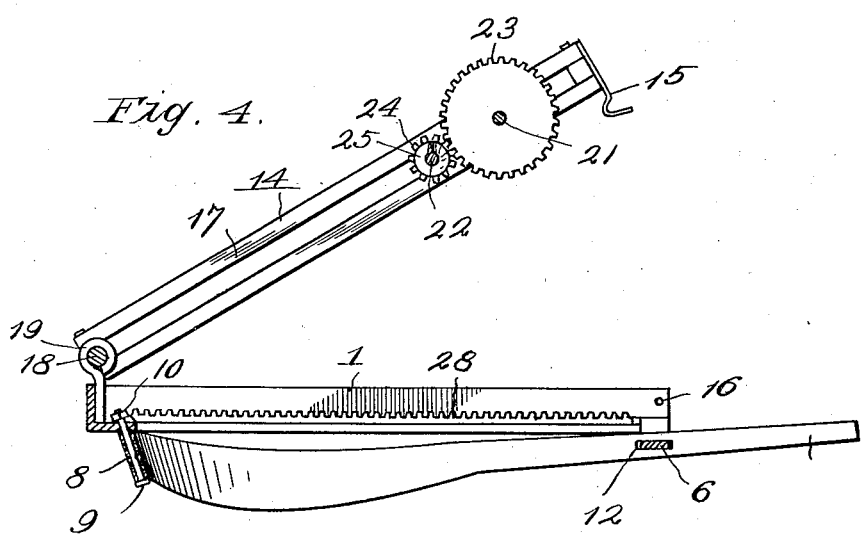
Witnesses:
R. E. Hamilton.
E. C. Lillian.
Inventor,
Charles Bursell,
By F. G. Fischer,
Atty.

UNITED STATES PATENT OFFICE.

CHARLES BURSELL, OF GUYMON, OKLAHOMA.

HOOF-PARER.

1,023,990. Specification of Letters Patent. Patented Apr. 23, 1912.

Application filed August 25, 1911. Serial No. 645,901.

*To all whom it may concern:*

Be it known that I, CHARLES BURSELL, a citizen of the United States, residing at Guymon, in the county of Texas and State of Oklahoma, have invented certain new and useful Improvements in Hoof-Parers, of which the following is a specification.

My invention relates to machines for paring the hoofs of horses, etc., preparatory to shoeing the same, and one object is to provide a simple, inexpensive and efficient device of this character whereby the hoofs of horses may be clamped and held in position during the paring operation.

A further object is to provide a novel device of this character which will operate uniformly upon all sizes of hoofs, and upon hoofs of all conditions and degrees of hardness, and pare the whole surface of the hoof evenly for the reception of a shoe.

Figure 1:
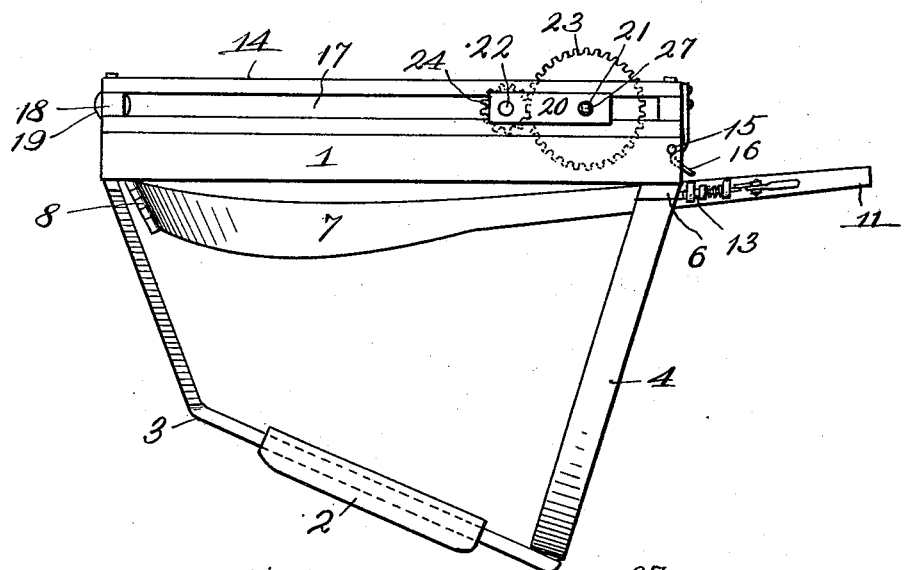
Figure 2:
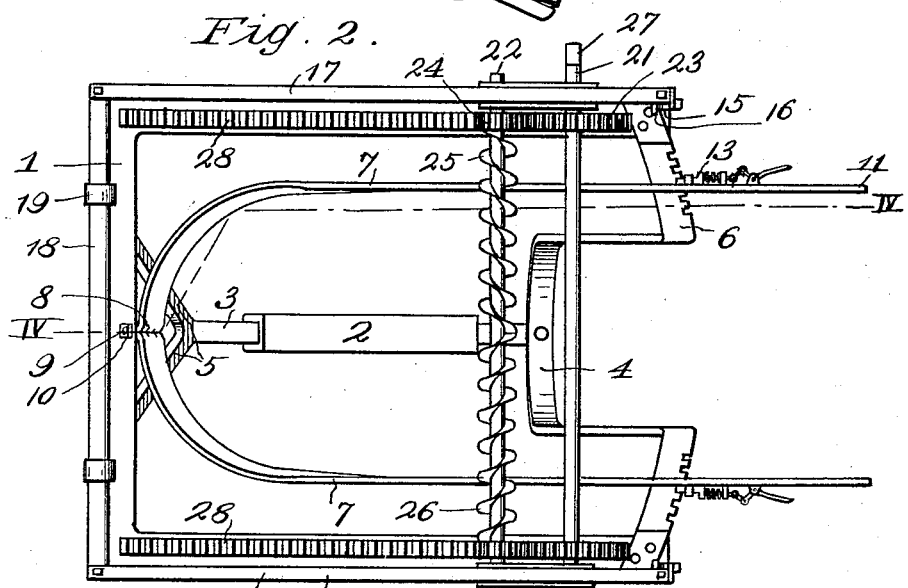

Other objects of the invention will hereinafter appear, and in order that said invention may be fully understood, reference will now be made to the accompanying drawings, in which:

Figure 1 shows a side elevation of my improved device. Fig. 2 is a plan view of the device. Fig. 3 is a rear elevation of the device. Fig. 4 is an irregular longitudinal section taken on line IV—IV of Fig. 2, showing a supplemental frame carrying the paring-knife, in raised position.

In carrying out the invention, I employ a main frame 1, substantially U-shaped in plan view, and constructed, preferably, of angle-iron to obtain considerable strength and rigidity with but little weight.

2 designates a handle secured to frame 1 by means of a bar 3 and a loop 4. Bar 3 is bent, as shown in Fig. 1, to leave room between the main frame and said bar for the hoof to be pared, and its forward bifurcated end 5 is firmly secured to the front transverse portion of the main frame 1. Loop 4 is of sufficient width to admit the animal's ankle and the upper ends of said loop extend laterally in opposite directions to form notched segments 6, which are firmly secured to the ends of the main frame 0,1, for a purpose which will hereinafter appear.

7 designates a pair of clamping-members whereby the device is firmly secured to the hoof, preparatory to paring the same. Said clamping-members are hinged together at their forward ends 8, the pintle 9 of said hinge being secured centrally of the forward transverse portion of the main frame 1, by a nut 10. The rear portions of the clamping-members 7 extend beyond segments 6 to form a pair of handles 11, having slots 12, through which the segments extend to prevent independent vertical movement between the segments and said handles. Each handle 11 is provided with a spring-pressed detent 13, adapted to engage any of the notches of its respective segment 6, to lock the handle at any point on said segment.

14 designates a supplemental frame hinged at its forward end to the main frame, so that it may be lowered to rest thereon as shown in Fig. 1, or tipped upward, as shown in Fig. 4. The rear end of frame 14 has a pair of depending latches 15 adapted to engage two studs 16, extending inward from the ends of frame 1, and thus reliably holding frame 14 down in position upon frame 1. Supplemental frame 14 comprises a pair of longitudinally-slotted rails 17, and a transverse rod 18, connecting the forward ends of said slotted rails and pivotally-mounted in a pair of upwardly-extending eyes 19, secured to the forward transverse portion of the main frame 1.

20 designates a pair of cross-heads reciprocably-mounted in the slotted rails 17, and carrying journaled shafts 21 and 22, the former of which is provided with a pair of fixedly-mounted cog-wheels 23, and the latter with a pair of fixedly-mounted pinions 24, said pinions being driven by the cog-wheels 23. Shaft 22 is provided with a screw-like cutter, one half of the blades 25 of which are inclined to the left, and the other half of the blades 26 to the right, to prevent end thrust of the cutter when paring a hoof. Shaft 21 has rectangular terminals 27 to receive a crank, not shown, whereby said shaft may be rotated. Cog-wheels 23 are adapted to traverse a pair of racks 28, fixed to the opposite sides of the main frame 1, and thus drive the pinions 24 and the cutter.

In practice the clamping-members 7 are thrown apart and the supplemental frame 14 is tipped upwardly in applying the device to a hoof, which can be readily done after grasping handle 2. After the device has been brought into proper relation with the upturned bottom of the hoof, it is firmly secured in place by closing the clamping-members 7 upon said hoof and locking said clamping-members through the intermediacy of handles 11, detents 13, and the notched segments 6. Supplemental frame 14 is then latched down upon the main frame 1, and the cutter is run back and forth to uniformly pare the bottom of the hoof by applying the crank to one end of shaft 21 and turning said crank in one direction until the cutter has passed forwardly over the hoof, and then reversing the motion of said crank, to cause the cutter to travel to the rear of the hoof. This operation is repeated until the bottom of the hoof is perfectly even and ready to receive the shoe. While operating the crank with one hand, the device is firmly held by grasping handle 2 with the other hand. The crank can be applied to either the right or left end of shaft 21, to accommodate a right or left handed operation.

Having thus described my invention, what I claim and desire to secure by Letters Patent, is:

1. In a device of the character described, a frame, means to secure said frame in proper relation to a hoof, reciprocable cross-heads at opposite sides of said frame, a cutter journaled in said cross-heads, and means to rotate said cutter and actuate the cross-heads, so that they will carry the cutter to and fro over the hoof.

2. In a device of the character described, a frame, means to secure said frame to a hoof, cross-heads reciprocably mounted at opposite sides of said frame, a rotary cutter journaled in said cross-heads and adapted to travel to and fro over the hoof to pare the same, pinions to actuate said cutter, cog-wheels to drive said pinions and travel to and fro over the frame, rack-bars on the frame to coöperate with the cog-wheels, and a drive shaft carrying said cog-wheels and journaled in the cross-heads.

3. In a device of the character described, a main frame, means to secure said main frame to a hoof, a supplemental frame hinged to said main frame at one end so that it may be tipped upward therefrom, and a rotary cutter adapted to travel longitudinally over the supplemental frame and pare the hoof.

4. In a device of the character described, a main frame, means to secure said main frame to a hoof, a supplemental frame hinged to said main frame at one end so that it may be tipped upward therefrom a rotary cutter adapted to travel longitudinally over the supplemental frame and pare the hoof, and means to secure the supplemental frame in lowered position upon the main frame.

5. In a device of the character described, a main frame, means to secure said main frame to a hoof, a longitudinally-slotted supplemental frame hinged at one end to the main frame, so that it may be tipped upward therefrom, latches to secure the supplemental frame in lowered position upon the main frame, cross-heads reciprocably mounted in the slotted portions of the supplemental frame, a rotary cutter journaled in said cross-heads, and means to rotate said cutter and cause it to travel to and fro over the hoof to pare the same.

6. In a device of the character described, a frame, a rotary cutter coacting with said frame to pare a hoof, a pair of clamping members to secure the frame to the hoof and hinged together at their forward ends and terminating at their rear ends in handles, the forward ends of said clamping-members being also secured to the frame, spring-pressed detents carried by the handles of said clamping-members, and notched segments coacting with said detents and secured to the frame.

7. In a device of the character described, a frame, a cutter coacting with said frame to pare a hoof, a handle to manipulate said frame, a bent bar securing the forward end of said handle to the forward end of the frame, a loop terminating in notched segments to secure the rear end of the handle to the frame, a pair of clamping-members operably connected to the frame and adapted to firmly grasp the hoof, and means carried by said clamping-members to engage the notched segments to lock the clamping-members in any of their adjusted positions.

In testimony whereof I affix my signature, in the presence of two witnesses.

CHARLES BURSELL.

Witnesses:
ELMER BEACH,
M. R. LIBBITT.

---

Copies of this patent may be obtained for five cents each, by addressing the "Commissioner of Patents, Washington, D. C."